(12) United States Patent
Takahashi et al.

(10) Patent No.: US 6,937,399 B2
(45) Date of Patent: Aug. 30, 2005

(54) OPTICAL FUNCTIONAL SHEET

(75) Inventors: Hiromitsu Takahashi, Otsu (JP); Motoyuki Suzuki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/659,399

(22) Filed: Sep. 11, 2003

(65) Prior Publication Data

US 2004/0047042 A1 Mar. 11, 2004

Related U.S. Application Data

(63) Continuation of application No. PCT/JP02/02381, filed on Mar. 13, 2002.

(30) Foreign Application Priority Data

| Mar. 16, 2001 | (JP) | ........................................ | 2001-075847 |
| Jul. 27, 2001 | (JP) | ........................................ | 2001-228030 |
| Jul. 27, 2001 | (JP) | ........................................ | 2001-228031 |

(51) Int. Cl.[7] ............................................. G02B 13/20
(52) U.S. Cl. ...................................... 359/599; 359/615
(58) Field of Search ............................. 359/591–599, 359/615

(56) References Cited

U.S. PATENT DOCUMENTS

| 5,066,099 A | * | 11/1991 | Yoshida et al. .............. 359/457 |
| 5,161,041 A | | 11/1992 | Abileah et al. ................ 359/40 |
| 6,219,119 B1 | | 4/2001 | Nakai .......................... 349/113 |
| 6,297,908 B1 | | 10/2001 | Suga ............................ 359/599 |
| 2001/0030638 A1 | | 10/2001 | Kashima ...................... 345/102 |

FOREIGN PATENT DOCUMENTS

JP        2002-214411 A        7/2002

* cited by examiner

Primary Examiner—Drew A. Dunn
Assistant Examiner—Joshua L. Pritchett
(74) Attorney, Agent, or Firm—Kubovcik & Kubovcik (57) ABSTRACT

An optical functional sheet characterized in that, at least within the sheet, a light diffusing phase and a transparent phase each extend along a direction perpendicular to the surface of the sheet and are alternately arranged along the sheet surface direction. The optical functional sheet has a smooth surface that can be surface-treated or laminated with another functional sheet and is provided with a light collecting effect due to the internal arrangements thereof that is capable of collecting both light diverging transversely and light diverging longitudinally using a single sheet. Thus, the sheet can be useful for applications such as the backlight for liquid crystal displays.

24 Claims, 7 Drawing Sheets

OPTICAL FUNCTIONAL SHEET

This application is a continuing application of an international application, PCT/JP02/02381, filed Mar. 13, 2002.

TECHNICAL FIELD

The present invention relates to optical functional sheets that are employed for light fittings or preferably for use with backlights of various displays, in particular, liquid crystal displays.

BACKGROUND ART

In recent years, various types of displays are employed for all sort of applications such as portable devices, personal computers, monitors or televisions. Among them, liquid crystal displays are widely used for various applications which include miniaturized products for portable devices and which recently have spread to larger products such as monitors and televisions. The liquid crystal display itself is not a luminous object, and it becomes possible to use it as a display by introducing light from the backside with a backlight.

It is required for the backlight not only to simply irradiate light, but also to illuminate the entire image uniformly and brightly. Thus, an optical functional sheet such as a light diffusive sheet or a prism sheet is commonly added for the purpose of uniformly brightening the backlight. More specifically, the backlight commonly comprises a light diffusive sheet that equalizes the distribution of light emission across the light guiding plate, and additionally the prism sheet is superposed to collect light in a normal direction to the sheet surface for the purpose of improving brightness.

The prism sheet is a sheet having a configuration in which a number of prisms having a generally triangular cross section are arranged, and the use of this sheet effectively collects light from the backlight and directs it in the normal direction to the sheet surface, thereby improving brightness in the normal direction to the sheet surface (see, for example, U.S. Pat. No. 5,161,041).

However, since the columns of prisms located on the surface of the prism sheet are very delicate and have a conformation of sharp apexes, the prism sheet may readily scratch the surface during production or handling, and thus provides a drawback of deteriorating the quality of images. In addition, an additional light diffusive sheet having lower diffusivity is used for the purpose of hiding the lines of prism columns, thereby increasing the number of sheets used for the backlight.

In addition, further improvements in performance and effectiveness or further improvements in reducing thickness and weight are required for the optical functional sheet used for these backlights, and it is useful for achieving these requirements to integrate functions such as applying a functional layer on the surface and sticking another sheet thereon, and the like. However, the surface treatment is not available for the type of sheet such as, typically, a prism sheet, which performs its function as a result of its surface configuration.

The present inventors have found, as a result of their various investigations carried out for the purpose of solving the problems indicated above, a sheet having a function of internally collecting light which is not derived from its surface configuration, and thus the present invention has been achieved.

An object of the present invention is to provide an optical functional sheet which is capable of providing a function of collecting light due to its internal configuration without utilizing any function of collecting light due to its surface configuration, and which can significantly improve the brightness in a normal direction to the sheet surface in the case of being used for applications such as a backlight for liquid crystals. Further, it is an object to present a conjugated optical functional sheet having the function of collecting light as well as other functions.

DISCLOSURE OF THE INVENTION

An optical functional sheet of the present invention is characterized in that, at least within the sheet, a light diffusing phase and a transparent phase extending in a direction perpendicular to the surface of the sheet are alternately arranged along the sheet surface direction.

Further, the optical functional sheet of the present invention preferably has the following characteristics:

(a) the light diffusing phases and the transparent phases are disposed in a manner in which the light diffusing phases are continuous phases which are mutually coupled in a direction along the sheet surface, and the transparent phases are discontinuous phases which are decoupled by the light diffusing phases;

(b) the shape of a projected image of the transparent phase onto the sheet surface is selected from the group consisting of trigon, tetragon, hexagon, circle and ellipsoid;

(c) the light diffusing phase is a transparent matrix component, in which fine particulate matter having a different refractive index from that of the matrix component is dispersed;

(d) the light diffusing phase contains a number of bubbles, and the transparent phase does not contain bubbles;

(e) the ratio of the length L of the transparent phase in the direction of the film thickness of the sheet to the length p of transparent phase in the direction along the sheet surface: (L/p), in any cross section of the sheet, is 2–10;

(f) the shapes of the cross sections of the light diffusing phases and the transparent phases normal to the surface of the sheet are selected from the group consisting of rectangle, square, parallelogram, trapezoid, trigon, campanulate or bell shape, horn shape, ellipsoid or a combination thereof;

(g) the ratio of the length L' of the light diffusing phase in the direction of the film thickness of the sheet to the length q of light diffusing phase in the direction along the sheet surface: (L'/q), in any cross section of the sheet, is not less than 1;

(h) the area ratio of area of the light diffusing phase to area of the transparent phase within the surface of the sheet, i.e., when observed from a direction perpendicular to the surface of the sheet, is 1/50–1/1;

(i) the film thickness is 10–500 $\mu$m;

(j) the sheet is a combined optical functional sheet which is formed by laminating (1) any one of the optical functional sheets described above and (2) another optical functional sheet;

(k) the other optical functional sheet (2) is a light diffusive sheet comprising a transparent matrix component in which fine particulate matter having a different refractive index from that of the matrix component is dispersed; or (l) the sheet is an optical functional sheet adopted for the backlight of the liquid crystal displays.

REFERENCE NUMERALS

1: a light diffusing phase;
2: a transparent phase;
3: an optical functional sheet;
4: a light diffusive sheet;
5: a light guiding plate;
6: a fluorescent tube;
7: a reflecting sheet;
8: a phase having a mirror reflecting surface layer; and
9: a transparent phase having a refractive index different from that of 2.

BEST MODE FOR CARRYING OUT THE INVENTION

An optical functional sheet of the present invention is characterized in that at least a light diffusing phase and a transparent phase that each extend in a direction perpendicular to the surface of the sheet are alternately arranged within the sheet in the direction of the surface of the sheet. FIG. 1 includes schematic views of preferred embodiments of the optical functional sheet according to the present invention, showing vertical cross sections of the sheet. A light diffusing phase 1 and a transparent phase 2 having various cross sectional shapes stand in a relationship in which the central line thereof is generally normal to the sheet surface, and are alternately arranged in the direction of the surface of the sheet (the lateral direction in the figures). For example, upon mainly considering the cross sectional shape of the light diffusing phase, various types of shapes may be preferably used, such as a rectangle (a), square, parallelogram, trapezoid (b), trigon (c), campanulate or bell shape (d), horn shape (e), ellipsoid (f), or other shape such as a modification thereof or a mixture of various shapes. A similar shape to that of light diffusing phase 1 is also preferably used for the cross sectional shape of the transparent phase 2. The present invention includes a case in which respective light diffusing phases 1 and transparent phases 2 extend in a direction generally normal to the sheet surface, as long as the advantageous effect of the present invention is not adversely affected. Here the terminology "extend in a direction generally normal to the sheet surface" means that the respective light diffusing phases 1 and transparent phases 2 extend at an angle within +/−15 degrees of the direction normal to the sheet surface.

Figure 1A:
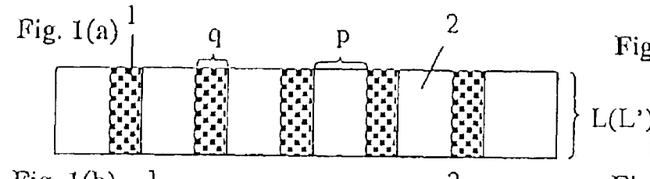
FIG. 1 includes schematic views showing cross sections of preferred embodiments of the optical functional sheet according to the present invention.
Figures 1B, 1C:
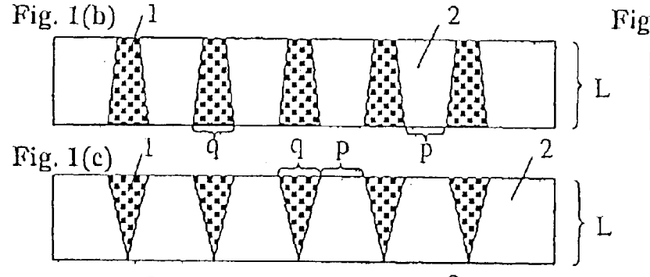
Figures 1D, 1E:
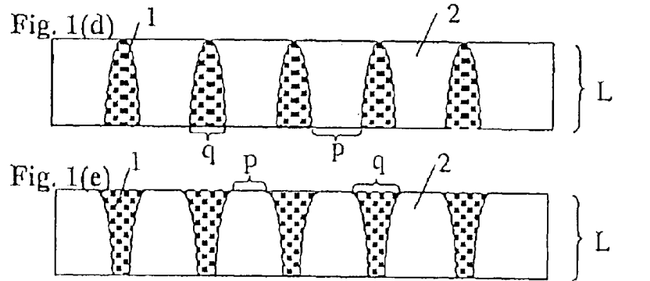
Figure 1F:
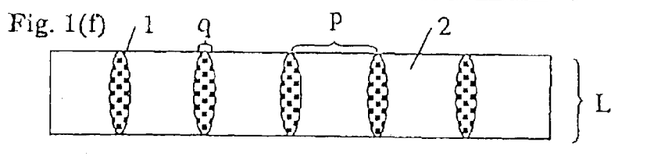
Figure 1G:
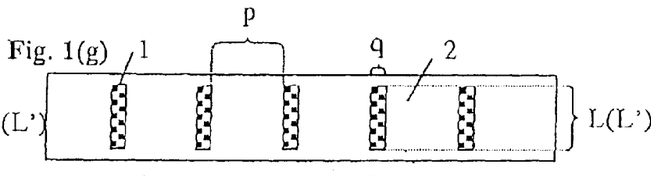
Figure 1H:
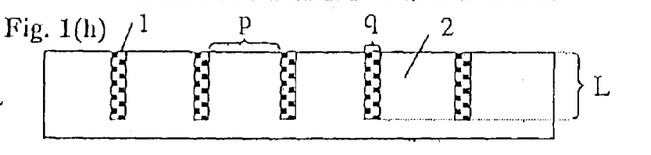

The light diffusing phase 1 may have a length in the thickness direction of the sheet that is comprised of not less than 50% of the sheet thickness, and more preferably of not less than 70%. FIG. 1(a)-(f) illustrate examples in which the light diffusing phases 1 and the transparent phases 2 have a length that comprises 100% of the sheet thickness, and FIGS. 1(g) and (h) illustrate examples in which the light diffusing phases 1 and the transparent phases 2 have a length that comprises about 70% of the thickness. FIG. 1(g) illustrates an example in which a part of the sheet proximate to the upper surface and a part of the sheet proximate to the lower surface are covered by the transparent phases 2, and FIG. 1(h) illustrates an example in which either the upper surface or the lower surface is covered by the transparent phases 2. It is preferable for the transparent phase 2 of the present invention to have a portion that continues from the front surface to the back surface through the thickness direction of the sheet.

The optical functional sheet according to the present invention is characterized in that a light diffusing phase and a transparent phase are alternately arranged within the sheet in the direction of the surface of the sheet. In FIGS. 1(a)–(h) showing the cross sections, a structure is illustrated in which the light diffusing phases 1 and the transparent phases 2 are alternately arranged in the direction of the surface of the sheet (the lateral direction in these figures).

The optical functional sheet of the present invention meets the objects of the invention if the cross sectional shape and the alternately arranged structure of the light diffusing phases 1 and the transparent phases 2 as shown in FIG. 1 are observed in at least one cross section when the observation is carried out for 18 cross sections that are carved out by every 10 degrees in reference to an arbitrary point on the sheet surface by using a scanning electron microscope or an optical microscope and so on. It is preferable if they are observed at nine or more cross sections, and more preferably, at 12 or more cross sections.

Figure 2A:
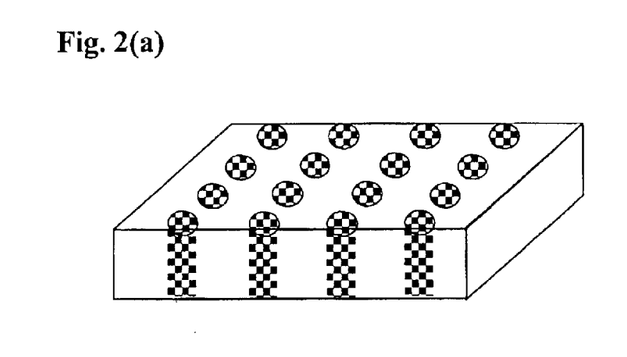
FIG. 2 includes schematic perspective views showing preferred embodiments of the optical functional sheet according to the present invention.
Figure 2B:
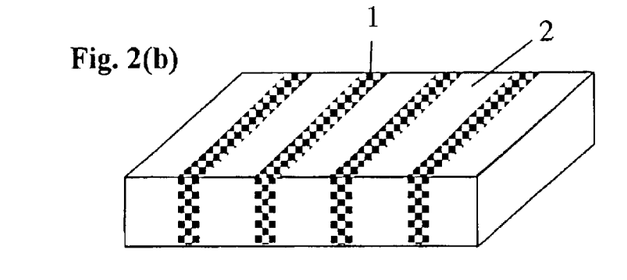
Figure 2C:
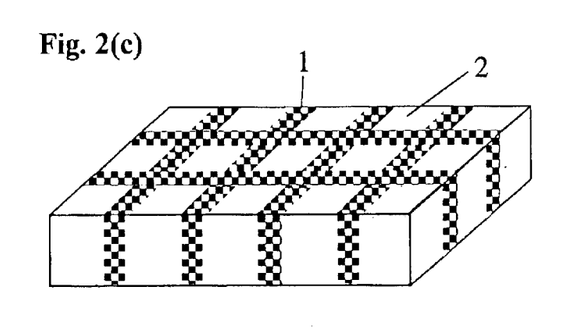

The following three types of arrangements are preferably used for the surface directional structure of the optical functional sheet according to the present invention. These are, when viewing the sheet from the upper side of the sheet surface, (1) an arrangement in which the light diffusing phases 1 are included in the transparent phase 2 in a scattered manner; (2) an arrangement in which the light diffusing phases 1 coupled in one direction are arranged in the transparent phases 2; and (3) the transparent phases 2 are included in the light diffusing phases 1 in a scattered manner. In each case, either a regular arrangement or a random arrangement may preferably be employed for the arrangements. FIG. 2 shows arrangements in the surface direction of the optical functional sheet according to the present invention when viewing the sheet in a perspective manner. FIG. 2(a) illustrates an arrangement in which cylindrical light diffusing phases 1 are arranged in the transparent phase 2 (corresponding to (1) described above); FIG. 2(b) illustrates an arrangement in which linear light diffusing phases 1 are arranged in the transparent phase 2 (corresponding to (2) described above); and FIG. 2(c) illustrates an arrangement in which lattice light diffusing phase 1 are arranged in the transparent phase 2 (corresponding to (3) described above).

Further, in (1), the shape of the light diffusing phases 1 that are disposed in a scattered manner when viewing the sheet from the upper side may preferably be a circle, ellipsoid, trigon, tetragon, hexagon, modifications thereof or combinations thereof.

In addition, the optical functional sheet of the present invention preferably comprises light diffusing phases 1 arranged therein that are mutually coupled to provide a continuous phase, and transparent phases 2 arranged therein that are decoupled by the light diffusing phases to provide a discontinuous phase.

Here the condition of "the light diffusing phases 1 are mutually coupled" represents a condition that the surface directional structure in the sheet surface direction is the state of the aforementioned (2) and (3). FIG. 3 and FIG. 4 illustrate the preferable conditions viewed from the upper side in which the light diffusing phases 1 are mutually coupled.

Figure 3A:
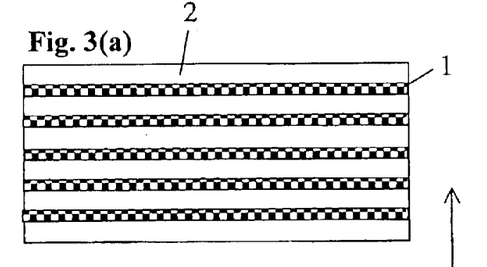
FIG. 3 includes schematic plan views of preferred embodiments of the optical functional sheet according to the present invention.
Figure 3B:
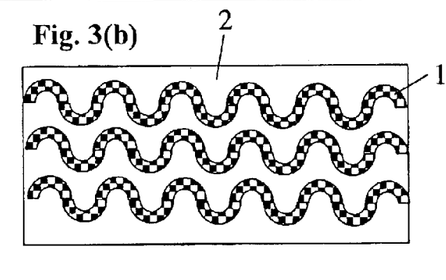
Figure 3C:
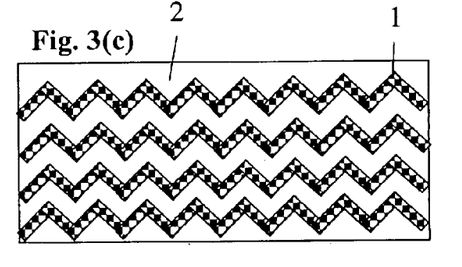

FIG. 3 illustrates the condition of the aforementioned (2), and more particularly, FIG. 3(a) illustrates a pattern in which the light diffusing phases 1 extend linearly; FIG. 3(b) illustrates corrugated curves such as a sine curve as a typical example; and FIG. 3(c) illustrates a jagged pattern. The pattern is not limited to the patterns disclosed here, and various patterns can be used as desired. In these figures, it is shown that the light diffusing phases 1 are "continuous phases mutually coupled" by observing the elongation direction which is generally linearly continuous, and that "the transparent phases 2 are phases decoupled by the light diffusing phases 1" when observing the transverse direction which crosses therewith. Either a regular arrangement or a random arrangement may be employed for the arrangements.

Similarly, FIG. 4 illustrates an example of preferable embodiments of the aforementioned (3), which forms a surface configuration in which the transparent phases 2 are included in the light diffusing phases 1 in a scattered manner. The shape of the transparent phases 2 may be a trigon, tetragon, hexagon, circle and an ellipsoid and so on. FIG. 4(a) illustrates a case in which the transparent phases 2 are circular shaped, FIG. 4(b) illustrates a case of a trigonal shape, FIG. 4(c) illustrates a case of a tetragonal shape, and FIG. 4(d) illustrates a case of a hexagonal shape. Modifications thereof may be employed. Either a regular arrangement or a random arrangement may be preferably employed of the transparent phases 2 existing in a scattered manner, regardless of the condition of the arrangement. The most preferable surface configuration for the optical functional sheet according to the present invention is the configuration shown in the aforementioned (3) in which the transparent phases 2 are included in the light diffusing phases 1 in a scattered manner.

Preferable materials for use with the optical functional sheet according to the present invention are illustrated below. The materials should not be construed as being limited thereto.

Preferable materials employed for the transparent phase 2 are: for example, polyester resins such as polyethylene terephthalate, polyethylene-2,6-naphthalate, polypropylene terephthalate and polybutylene terephthalate; polyolefin resins such as polyethylene, polypropylene and polymethylpentene; acrylic resins such as poly(meth)acrylate; polycarbonate; polystyrene; polyamide; polyether; polyester amide; polyether ester; polyvinyl chloride; alicyclic polyolefins; and copolymers containing these materials as main components; or transparent resins comprising mixtures of these resins. Transmittance of the transparent phase may be selected so that the collecting or condensing characteristics exhibited by the optical functional sheet according to the present invention do not considerably deteriorate, and it is exemplified that haze of the transparent phase for the thickness of the optical functional sheet is equal to or not higher than 10%.

Next, the light diffusing phase 1 is preferably a transparent matrix component in which fine particulate matter having a different refractive index from that of the matrix component is dispersed.

Similar materials to the aforementioned materials useful for the transparent phase can be illustrated as materials useful for the transparent matrix component. For example, polyester resins such as polyethylene terephthalate, polyethylene-2,6-naphthalate, polypropylene terephthalate and polybutylene terephthalate, polycarbonate, polystyrene, polyolefin resins such as polyethylene, polypropylene and polymethylpentene, polyamide, polyether, polyester amide, polyether ester, polyvinyl chloride, acrylic resins such as poly(meth)acrylate, alicyclic polyolefins, and copolymers containing these materials as main components, or transparent resins comprising mixtures of these resins can be used.

The fine particulate matter dispersed in the transparent matrix component is the diffusion component. Here the materials for the fine particulate matter are not particularly limited provided that the material has a refractive index different from that of the matrix component. As the particulate matter, for example, crystalline compounds exemplified by spherulites generated from polymer materials; organic compounds exemplified by acrylic resins, organic silicone resins, polystyrene resins, polyurea resins, formaldehyde condensation compounds, fluorocarbon resins, polyolefin resins, polyester resins and so on; inorganic compounds such as glass, silica, barium sulfate, titanium oxide, magnesium sulfate, magnesium carbonate, calcium carbonate and so on; and voids such as bubbles, can be used.

Particle shape of these fine particles is not particularly limited, and particles having various shapes such as spherical form, spheroid form, disk form, rod form, plate form and so on, an indefinite shape, an agglomerated form and so on can be employed. The mean particle size of this fine particulate matter may preferably be 0.1–50 $\mu$m so as to form sheets having high transmittance, being achromatically colored and having fine patterns.

The light diffusing phases 1 are created by making the refractive index of the fine particulate matter different from the refractive index of the transparent matrix. If the refractive index is the same between the fine particulate matter and the transparent matrix, refraction followed by scattering does not occur at the interface. In order to obtain a light diffusing phase 1 having substantially effective light diffusivity, the difference in the refractive index between the fine particulate matter and the transparent matrix is not less than 0.05, and more preferably not less than 0.1. A refractive index difference of less than 0.05 presents a smaller light diffusing effect.

A transparent matrix that contains a number of bubbles in a dispersed manner to obtain light diffusivity is preferably employed for the light diffusing phase 1 of the optical functional sheet according to the present invention. In such a case, it is preferable for the transparent phase 2 to exclude bubbles ("exclude" includes "substantially exclude"), to prevent the effect of the present invention from being impaired.

Since the refractive index of bubbles, i.e., of air, is as small as 1.0, the refractive index difference can be increased by combining the bubbles with any transparent resin matrix component. For this reason, the efficiency on scattering and reflecting at the interface increases, thereby enabling the production of a light diffusing phase 1 having better diffusivity with thinner thickness.

Figure 5A:
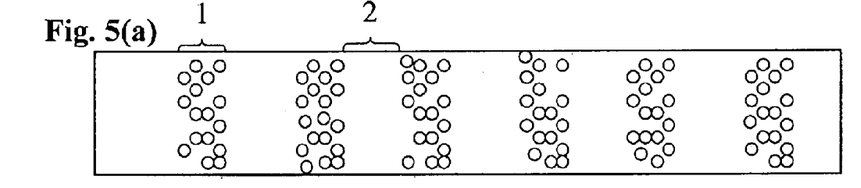
FIG. 5 includes schematic views showing cross sections of preferred embodiments of the optical functional sheet according to the present invention, in which a light diffusing phase containing a number of bubbles is used.
Figure 5B:
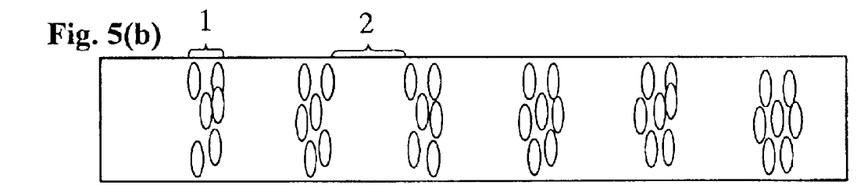
Figure 5C:
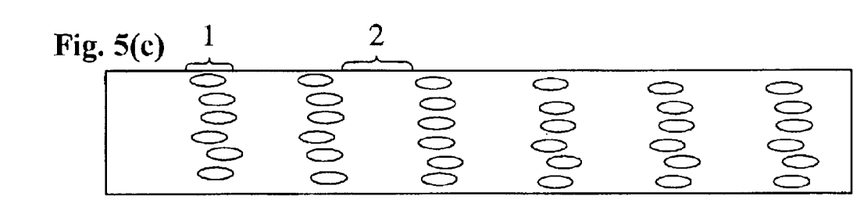

The mean particle size of bubbles contained in the light diffusing phase 1 is preferably 0.1–50 $\mu$m, and more preferably 0.1–20 $\mu$m. FIGS. 5(a)–5(c) are schematic cross sectional views showing the case in which the light diffusing phases 1 of the optical functional sheet according to the present invention contain a number of bubbles. Circles or ellipsoids shown in these figures schematically represent the shape of bubbles. The shape of bubbles contained in the light diffusing phases 1 may be a spherical form as shown in FIG. 5(a); a solenoid form or disk form having an elongated axis along a line perpendicular to the surface as shown in FIG. 5(b), or a spheroid form or disk form having an elongated axis along a transverse direction as shown in FIG. 5(c), and in addition, modified forms thereof, or the same form having their axis along a different direction, or mixed forms thereof may also be used. Further, bubbles may be overlapped any number of times either in the thickness direction or the surface direction within the light diffusing phase 1, and the overlap may preferably be equal to or greater than two times for purpose of obtaining sufficient diffusivity required for the light diffusing phase 1. Here, the bubbles being overlapped means that a line drawn in the thickness direction or surface direction within the light diffusing phase will intersect a plurality of bubbles. In addition, a porous configuration may also be preferable for the light diffusing phase 1. Here the porous configuration may be employed regardless of the internal structure thereof, as long as the structure internally includes pores.

The optical functional sheet according to the present invention preferably includes a ratio of the length L of the transparent phase 2 in the thickness direction of the sheet to the length p of transparent phase 2 in the direction of the sheet surface (L/p), in any cross section perpendicular to the surface of the sheet, of 2–10.

FIG. 1 shows the length in the sheet thickness direction L of the transparent phase 2. If the light diffusing phase 1 extends from the front surface to the back surface, the transparent phase length L indicates the film thickness itself (FIGS. 1(a)–(f)). Also, If the upper or lower portions of the light diffusing phases 1 are covered by the transparent phases as shown in FIG. 1(g) and FIG. 1(h), the light diffusing phase length represents the length L of the transparent phase.

Also, the surface directional length p of the transparent phase 2 is shown in FIG. 1. FIG. 1(a), FIG. 1(g) and FIG. 1(h) illustrate the case in which the width of the transparent phase is constant along the sheet thickness direction, and the rest of the figures of FIG. 1 illustrate the case in which the width of the transparent phase varies along the sheet thickness direction. Concerning "p" in the case in which the width of the transparent phase varies along the sheet thickness direction, the surface directional length of the transparent phase "p" is selected as the shorter one when comparing the length in the upper most portion or in the lower most portion.

The optical functional sheet according to the present invention preferably includes the ratio L/p of 2–10. Concerning an arbitrary cross section for measuring the transparent phase length L and the transparent phase surface directional length p according to the present invention, observations are carried out for 18 cross sections that are carved out by every 10 degrees in reference to an arbitrary point on the sheet surface by using a scanning electron microscope or an optical microscope and so on, and if 2–10 of L/p is observed for at least one cross section, the advantageous effect will be exhibited.

In addition, a smaller advantageous effect can be obtained by having the ratio out of the above range, and an L/p of less than 2 provides insufficient scattering characteristics presented by the light diffusing phase 1, and an L/p of greater than 10 provides excessively higher directivity of the generated beam.

The optical functional sheet according to the present invention preferably has a ratio of the length L' of the light diffusing phase in the thickness direction of the sheet to the length q of the light diffusing phase in the direction along the sheet surface: (L'/q), in any cross section perpendicular to the surface of the sheet, of not less than 1.

FIG. 1 shows the length in the sheet thickness direction L' of the light diffusing phase 1 and the surface directional length q of the light diffusing phase 1. FIG. 1(a), FIG. 1(g) and FIG. 1(h) illustrate the case in which the width of the light diffusing phase is constant along the sheet thickness direction, and the rest of figures of FIG. 1 illustrate the case in which the width of the light diffusing phase varies along the sheet thickness direction. Concerning "q" in the case in which the width of the light diffusing phase varies along the sheet thickness direction, the largest width of the light diffusing phase is selected as the surface directional length of the light diffusing phase "q".

The optical functional sheet according to the present invention preferably includes the ratio L'/q of not less than 1. Concerning an arbitrary cross section for measuring the light diffusing phase length L' and the surface directional length q of the light diffusing phase according to the present invention, observations are carried out for 18 cross sections that are carved out by every 10 degrees in reference to an arbitrary point on the sheet surface by using a scanning electron microscope or an optical microscope and so on, and it is preferable to have L'/q of not less than 1 for at least nine cross sections. If more than nine cross sections having L'/q of less than 1 are observed, the ratio of the light diffusing phase 1 dominating within the sheet surface becomes greater, and the masking effect becomes higher and the luminance improvement becomes lower and, thus is not preferable.

The optical functional sheet according to the present invention preferably includes the areal ratio of the area of the light diffusing phase to the area of the transparent phase within the surface of the sheet of 1/50–1/1, and more preferably 1/40–1/1.

An areal ratio of 1/50–1/1 provides the capability of maintaining higher utilization efficiency of the beam transmitted through the optical functional sheet according to the present invention and the capability of sufficiently utilizing the scattering characteristics presented by the light diffusing phase 1, thereby providing the improvement in luminance.

Further, in view of processability and of forming a light diffusing phase 1 that can provide sufficient light diffusivity, the thickness of the, optical functional sheet according to the present invention is preferably 10 $\mu$m–10 mm, and more preferably 10 $\mu$m–5 mm, and, additionally considering adaptation to miniaturization, is most preferably 10–500 $\mu$m.

Production methods for the optical functional sheet according to the present invention will be exemplified below, though the present invention is not limited thereto.

(1) In the case of the arrangement in which the transparent phase 2 and the light diffusing phases 1 are linearly arranged in the surface direction (FIG. 2(b)), the optical functional sheet according to the present invention is produced by alternately arranging transparent resin sheets and light diffusive sheets via adhesives and slicing them along a direction perpendicular to the sheet surface. Here, the light diffusive sheet means a sheet containing, for example, diffusive components such as organic fine particles, inorganic fine particles or bubbles in a transparent resin.

(2) Coating film comprising a transparent light-curable resin is formed onto a base sheet. The coating film is optically exposed through a photo mask having a predetermined pattern and then developed, and the unexposed portions are rinsed off to form the pattern. The light diffusing phase 1 is formed by filling the portion rinsed off via the development with a resin paste additionally containing the diffusive components such as fine particles and curing them, thereby obtaining the optical functional sheet.

(3) Resin additionally containing fine particles or the like is applied across the entire surface of a base sheet, then abrasives are flushed through a mask and the desired shapes are removed to form the light diffusing phase 1 (sand blasting), and then the portions removed are filled with transparent resins to obtain the optical functional sheet.

(4) A method comprising a step of applying a thermoplastic resin composition containing a photosensitive compound, which is capable of being decomposed by being exposed to light to generate a gas, onto the base sheet, and then exposing the composition with light via a mask.

The photosensitive compound, which is capable of being decomposed by being exposed to light to generate a gas, includes: diazonium salts and their resin compounds such as p-diethylaminobenzenediazonium-zinc chlorate, or -fluoroborate, p-dimethylaminobenzenediazonium-zinc chlorate, or -fluoroborate, 4-morpholino-2,5-dibuthoxybenzenediazonium-zinc chlorate, or -fluoroborate; quinone diazides and their resin compounds such as 1,2-naphthoquinone-2-diazido-4-sulfonic acid sodium salt; azide compounds and their resin compounds such as p-azide benzaldehyde, p-azide benzoate, or m-sulfonyl azide benzoate. These photosensitive compounds are blended with resins for a matrix component to create the thermoplastic resin composition containing the photosensitive compound which is capable of being decomposed by being exposed to light to generate gas, and the thermoplastic resin is applied onto a base sheet surface to a predetermined thickness. Then, it is covered with a photo mask having a pattern which shields portions corresponding to the transparent phases 2 to light, and is exposed to light via the photo mask. The pattern exposure allows the exposed portions to decompose the photosensitive compound contained in the coating film, thereby generating fine gases in the coating film. Subsequently, thermal processing is carried out to soften the thermoplastic resin, and simultaneously make the gases thermally expand. Accordingly, the light diffusing phases 1 containing a number of gas bubbles in a dispersed manner in the exposed portions are formed, and the unexposed portions become the transparent phase 2 being substantially free of the gas bubbles.

The required optical functional sheet can be obtained by using such a process in which air bubbles are distributed at necessary portions within the coating film. Here, for the purpose of improving the thermal stability of the resultant sheet, the matrix component may be cross-linked after forming gas bubbles.

(5) A method comprising a the step of employing a material of which the condition is changed between a phase separating condition and a phase miscible, or compatible, condition by thermal actions, and stabilizing the condition. The phase separating condition provides the light diffusing phase 1, and the phase miscible condition provides the transparent phase 2. The material may be either: (a) a high temperature phase separation type, having lower critical solution temperature (LCST), exhibiting phase solution at lower temperature, and inducing phase separation at a higher temperature; or (b) a low temperature phase separation type, having an upper critical solution temperature (UCST), exhibiting phase separation at lower temperature, and exhibiting phase solution at higher temperature. The phase separating configuration may include: a configuration of being mutually communicated; a configuration of being dispersed with liquid drops; a configuration of a combination thereof and so on. A combination of photo polymerizable materials is preferably employed for stabilizing these conditions.

The method for forming patterns is as follows. The above indicated pattern forming material is applied onto the surface of a base member, and after the system is treated to become entirely transparent by adjusting the thermal conditions, the system is exposed by light via a desired pattern to stabilize the transparency of the exposed portions, thereby forming the transparent phases 2. Then, the unexposed portions are phase-separated to become a white haze (light diffusing phases 1) while the transparency of the exposed portions are maintained, and the entire surface of the system is exposed by light as it is, to stabilize the condition of the unexposed portions that have not been exposed during the previous exposure process, thereby obtaining the desired optical functional sheet.

(6) A photo polymerizable composition comprising binder resin, photo polymerizable monomer, photo polymerization initiator, solvent and so on is applied onto the base member, and the system is subject to a pattern exposure, and the system is immersed into a solvent which is a good solvent for the photo polymerizable monomer and a poor solvent for the binder resin, and then the solvent is removed via vacuum pressure drying, to form a porous phase. The cured portions via photo polymerization provide transparent phases 2, and the uncured portions are processed to create the porous portions (light diffusing phases 1) to obtain the desired optical functional sheet.

The production methods illustrated above may preferably be accomplished by combining with various other methods.

Also, upon using these methods, it is not limited to use the combination of the transparent phases 2 and the light diffusing phases 1, but an alternate arrangement of phases having different diffusivities, i.e., having different haze, may be employed.

When the optical functional sheet according to the present invention having the configuration of the present invention is applied to the backlight of the liquid crystal display, light from the back can be effectively collected and transmitted in the normal direction to the sheet surface to provide a backlight having higher luminance. The following is a description of the mechanism that enables the luminance improvements.

Figure 6:
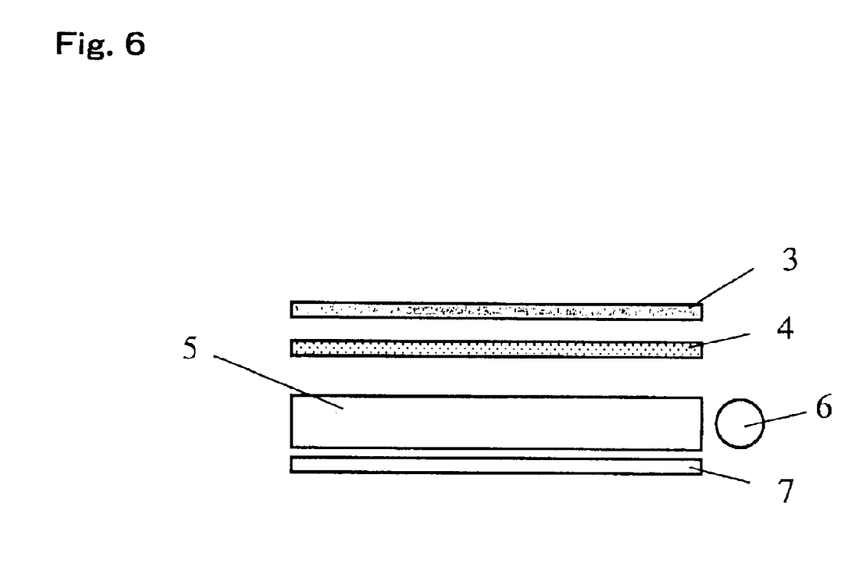
FIG. 6 is a view of apparatus structure showing the relative positioning relationships among respective parts of the backlight.
Figure 7A:
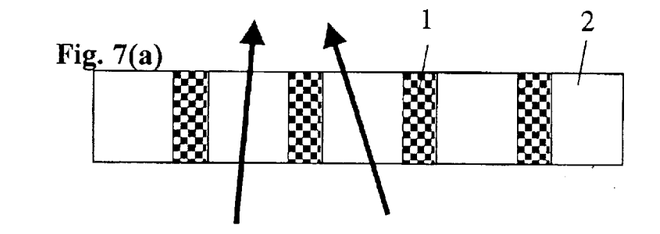
FIG. 7 includes diagrams describing the mechanism for achieving the luminance improvement effect of the optical functional sheet according to the present invention.
Figure 7B:
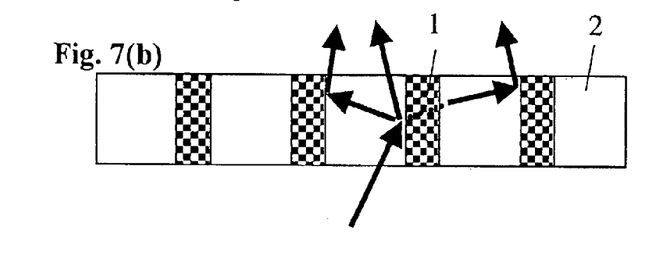
Figure 7C:
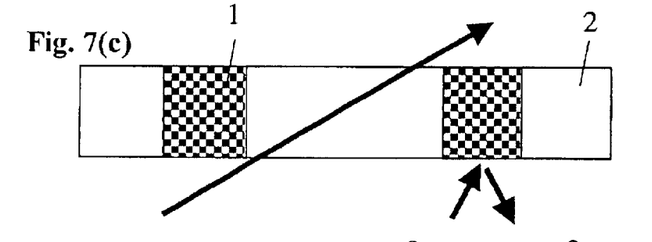
Figures 7D, 7E:
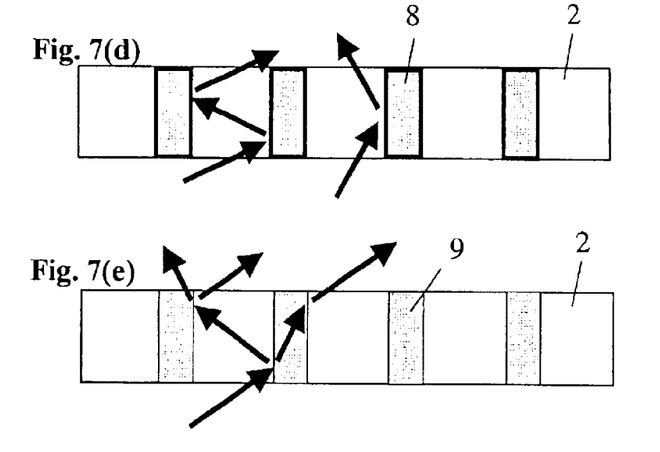

In FIG. 6, a light diffusive sheet 4 is disposed on the upper side surface of a light guiding plate 5, an optical functional sheet 3 is disposed thereon, and a reflective plate 7 is also disposed on the under side of the light guiding plate 5. Further, a fluorescent light tube 6 is disposed on the side of the light guiding plate 5. Here FIG. 6 shows the relative spatial relationship between the respective members in an exaggerated manner, and these members mutually contact when used as a backlight. Light generated from the fluorescent light tube 6 enters the light guiding plate 5 via the side of the light guiding plate 5, and proceeds through the upper surface, the optical functional sheet 4 and the sheet of the present invention 3, and eventually exits toward the upper direction.

The optical functional sheet 3 of the present invention includes the transparent phases 2 and the light diffusing phases 1 that are alternately arranged in a surface direction, and the light diffusing phases 1 act as walls that scatter the light beam.

The aspect of the light beam scattered by the light diffusing phases 1 is shown in FIG. 7.

Light beams which enter the optical functional sheet according to the present invention from the surface (from the lower side in FIG. 7) strike the light diffusing phases 1 and are diffusively transmitted or diffusively reflected. It is important for the present invention to suitably arrange the walls (light diffusing phases 1) for diffusively transmitting or diffusively reflecting.

An entering light beam originally having a normal direction to the sheet surface (having a lower incident angle) is transmitted substantially as it is (FIG. 7(*a*)), and a light beam entering along the horizontal direction (having a higher incident angle) is shielded by the light diffusing phases 1, and is diffusively transmitted or diffusively reflected. Among the light beams diffusively transmitted or diffusively reflected by the light diffusing phases 1, the component having the normal direction to the sheet surface exits therefrom, and the component having the direction other than the normal direction to the sheet surface is scattered again by the light diffusing phases 1 (FIG. 7(*b*)). The iteration of these steps allows the incident light beam to have directivity to the normal direction to the sheet surface, thereby providing luminance improvements for the use of the backlight for liquid crystal displays.

An important aspect for obtaining the luminance improvement is the surface pattern and the diffusivity of the light diffusing phases 1.

As shown in FIG. 7(*c*), in the alternate arrangement within the sheet, longer pitches between the light diffusing phases 1 along the surface direction provide an insufficient "wall" effect of the light diffusing phases 1 and allow incident light having a horizontal direction to pass straight therethrough, thereby providing lower luminance improvement. Also, wider bottoms of the light diffusing phases provide lower light utilization efficiency due to the increase of the probability of being reflected on the bottom of the sheet, thereby decreasing luminance. It is important to design the surface pattern of the light diffusing phases 1 which has suitable pitches while having a higher open area ratio.

Further, unlike the light diffusing phases that exhibit diffusive transmission or diffusive reflection of the optical functional sheet according to the present invention, in the case of using phases having mirror surface reflection characteristics (FIG. 7(*d*)), light beams entering from the underside exit maintaining the incident angle, and therefore the light beams are not collected into the normal direction to the sheet surface, and thus luminance improvement can not be expected. Also, in the case of a sheet including transparent phases having different refractive indices that are alternately arranged (FIG. 7(*e*)), although some component is refracted toward the normal direction to the sheet surface, total characteristics of the distribution of light including effective light collecting property in the normal direction of the sheet surface can not be expected. This indicates that the diffusive transmission characteristics or the diffusive reflection characteristics of the light diffusing phases 1 are important. In order to achieve improvement of these diffusive transmission characteristics and the diffusively reflecting characteristics, the difference in the refractive index between the diffusive component and the matrix component contained in the light diffusing phases 1 should be set to be larger and the density of the diffusive component should be set to be higher (i.e., having more interfaces) and so on.

The optical functional sheet according to the present invention achieves desired light collecting characteristics by adjusting the structure of light diffusing phase.

For a sheet having a surface pattern in which the light diffusing phases 1 are coupled along a single direction as shown in FIG. 3, the light distribution characteristic along the transverse direction is arbitrarily designed by adjusting the pitches of the array along the transverse direction shown in the figure and so on.

Also, for a sheet having a surface pattern in which the light diffusing phases 1 are coupled along a two dimensional direction as shown in FIG. 4, the light distribution characteristic along the two dimensional direction is arbitrarily designed by controlling the surface pattern thereof. In the case of a conventionally used prism sheet, since one ply thereof only provides collecting light in one direction of either transverse or longitudinal, two plies of the prism sheets are necessarily used to be superimposed such that respective arrangements of the prisms are arranged in an orthogonal relationship, for the purpose of obtaining the light collecting effect in two dimensions, transverse and longitudinal. The use of the optical functional sheet according to the present invention allows obtaining the light collecting effect in two dimensions, transverse and longitudinal, with a single ply sheet.

The optical functional sheet according to the present invention is preferably used as a sheet applicable to the backlight of a liquid crystal display, and for such application, improvement of the luminance in the normal direction to the sheet surface can be effectively achieved by piling it onto the light guiding plate or onto the light diffusive sheet.

Since the optical functional sheet according to the present invention exhibits its light collecting characteristics due to an arrangement contained in the interior of the sheet, the optical functional sheet is characterized in that the surface of the sheet can be smooth. For this reason, it is possible to obtain a combined optical functional sheet additionally including other types of optical functional sheets having other functions in a laminated manner without adversely affecting the light collecting characteristics. The combined optical functional sheet allows a function integrating sheet exhibiting multiple functions to be produced.

Other types of optical functional sheets to be laminated may include transparent resin sheets and light diffusive sheets. Combining the optical functional sheet according to the present invention with a transparent resin sheet provides an improvement in mechanical strength, thermal resistance and handling capability, and combining with a light diffusive sheet provides a function integrating sheet which achieves with one ply thereof the functions that have been achieved with the light diffusive sheet and the prism sheet used in the conventional backlight, thereby simultaneously improving the luminance of the backlight and the luminance uniformity.

The transparent resin sheet that can be used herein includes, for example, polycarbonate resin sheet or a biaxially oriented sheet of polyester resins exemplified by polyethylene terephthalate or polyethylene-2,6-naphthalate.

The light diffusive sheet that can be used herein is preferably a light diffusive sheet incorporating a diffusing function having a configuration in which a transparent matrix component contains fine particles having a different refractive index from that of the matrix component dispersed therein.

The thickness of the other types of optical functional sheets to be laminated is preferably 20 $\mu$m–500 $\mu$m in view of having higher mechanical strength, and more preferably 30 $\mu$m–300 $\mu$m, and further preferably 50 $\mu$m–200 $\mu$m.

The optical functional sheet according to the present invention can contain various additives as long as the advantageous effects of the present invention are not deteriorated. Available additives for addition and blending include, for example, pigments, dyes, optical brightening agents, antioxidants, heat resistant agents, photo resistant agents, antiweatherability agents, antistatic agents, release agents, thickeners, pH adjusters, salts and the like. Also, since the surface is smooth, an antistatic layer or a hard coat layer can additionally be formed thereon.

Evaluation Methods

A. Transmittance and Reflectance

Transmittance and reflectance were measured by employing spectrophotometer SE-2000 commercially available from NIPPON DENSHOKU INDUSTRIES CO. LTD.

B. Lamination Ratio and Aspect Ratio

A thin slice was cut off from the sheet cross section, and photographs thereof (transfer image) were taken at 400 magnification by using an optical microscope BH-2 and its camera commercially available from OLYMPUS INDUSTRIES CO. LTD., and the cross section was observed to obtain the aspect ratio thereof.

C. Haze

Transmittance and haze were measured by using an automated direct reading haze computer HGM-2DP commercially available from SUGA SHIKENKI Co. Ltd.

Here the term "haze" means a haze obtained by applying the following equations. The haze is a percentage of luminance which is scatter-transmitted by departing from the incident light flux while light from the light source passes through the specimen, and provided that total light beam transmittance is Tt, diffusive transmittance is Td, and direct transmittance is Tp, the total light beam transmittance Tt can be represented by the following equation:

$Tt=Td+Tp$.

Also, haze Ht can be represented as:

$Ht=100 \times Td/Tt$.

EXAMPLES

The present invention will be described in more detail by referring to the following examples. However, the present invention is not to be limited thereto.

Example 1

(Sheet 1) A three-layer laminated sheet was manufactured by employing the following formulation.

Inner Layer:

| polyethylene terephthalate (PET) | 98 parts by weight |
| polymethylpentene (PMP) | 2 parts by weight |

Surface Layer (On Both Sides): PET

These three layers were co-extruded at 280° C., were longitudinally stretched three fold at 85° C., were transversely stretched 3.5 fold at 90° C., and then were thermally processed at 200° C. to obtain a sheet having an inner layer as a diffusion layers of 50 μm and surface layers on both sides as transparent layers of 50 μm. Flat voids were generated around the PMP spherically dispersed in the inner layer. Transmittance of the resultant sheet was 50%.

(Sheet 2) A three-layered laminated sheet was manufactured by employing the following formulation.

Inner Layer:

| Copolymer of PET (isophthalic acid/<br>terephthalic acid/ethylene glycol = 17/83/100<br>(molar fraction)) | 90 parts by weight; and |
| polypropylene (PP) | 10 parts by weight |

Surface layer (on both sides): PET

These three layers were co-extruded at 280° C., were longitudinally stretched three fold at 85° C., were transversely stretched 3.5 fold at 90° C., and then were thermally processed at 230° C. to obtain a sheet having an inner layer as a diffusion layer of 50 μm and surface layers on both sides as transparent layers of 50 μm. Transmittance of the resultant sheet was 90%.

(Sheet 3) Silver was deposited on both sides of a transparent PET sheet having a thickness of 50 μm. The sheet had a reflectance of 96%.

The sheets 1 and transparent acrylic sheets having a thickness of 0.4 mm were alternately adhered in layers via adhesive to 30 cm, and the resultant sheet was cut at a thickness of 2.5 mm along the direction perpendicular to the sheet surface. The sheet comprising transparent phases and light diffusing phases arranged in a stripe manner were obtained. The cut sheet was mounted onto a backlight with four straight lamps for personal computer monitors, and the luminance in the normal direction to the sheet surface was measured by using luminance meter BM-7 commercially available from TOPCON Co. Ltd. Luminance increased by 25% as compared with the condition without the sheet.

Example 2

Two sheets prepared in Example 1 containing transparent phases and light diffusing phases that are arranged to form stripes, were stacked in a manner in which the striping arrangements of the sheets are orthogonally aligned, and luminance was measured as in Example 1, and the luminance was increased by 47%.

Example 3

Cut sheets were manufactured as in Example 1 except that the sheet 1 was replaced with the sheet 2, and luminance was measured, and the rate of luminance increase was 3.

Comparative Example 1

Cut sheets were manufactured as in Example 1 except that the sheet 1 was replaced with the sheet 3, and luminance was measured, and the rate of luminance increase was -3%.

Example 4

A composition for light diffusing phases having the formulation shown below was applied onto a polyethylene terephthalate (PET) sheet to have a dry film thickness of 200 μm:

| calcium carbonate (mean particle size 2 μm) | 60 parts by weight; |
| ethyl cellulose | 16 parts by weight; and |
| terpineol | 24 parts by weight. |

Then a mask for sandblasting having a lattice pattern was mounted thereon, and after that, unwanted portions were cut out. Alumina was employed as an abrasive. Subsequently, the cut portions were filled with an ultraviolet cure composition comprising tetrahydrofurfurylmethacrylate, and were exposed to ultraviolet to form transparent phases 2, thereby obtaining a desired optical functional sheet. The surface pattern of the resultant optical functional sheet includes square transparent phases 2, as shown in FIG. 2(c), and the pitch between the transparent phase/light diffusing phase on the surface was 20 µm/50 µm.

The resultant optical functional sheet was mounted on a backlight with a single straight lamp for notebook sized personal computers in the relative relationship as shown in FIG. 6, and the luminance of the normal direction to the sheet surface was measured by using a luminance meter BM-7 commercially available from TOPCON Co. Ltd. Luminance increased by 72% compared with the condition of the backlight free of the sheet. Contrary to the implementation of employing two sheets in the orthogonal manner as in the conventional prism sheet, the present invention provides that required number of sheets can be reduced and the required manpower for assembling is reduced.

Example 5–7

Figure 4A:
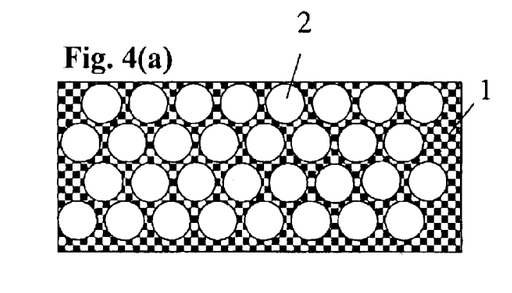
FIG. 4 includes schematic plan views of other preferred embodiments of the optical functional sheet according to the present invention.
Figure 4B:
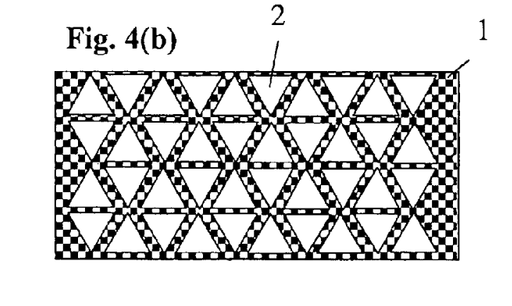
Figure 4C:
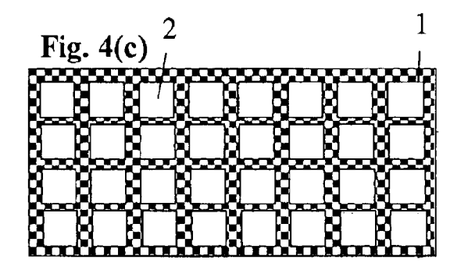
Figure 4D:
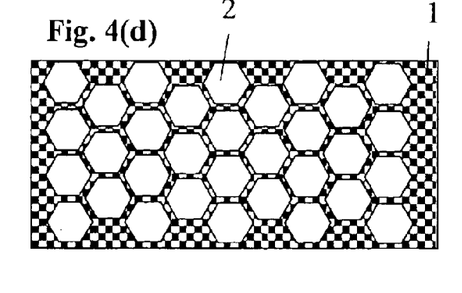

Optical functional sheets were manufactured as in Example 4 except that the mask patterns for sandblasting were changed to have patterns of the transparent phases in the surface of: perfect circle (Example 5: FIG. 4(a)); regular trigon (Example 6: FIG. 4(b)); and regular hexagon (Example 7: FIG. 4(d)), and light intensities were measured. In each of patterns, the distance between centers of adjacent transparent phases 2 was 70 µm (transparent phase 25 µm/light diffusing phase 20 µm/transparent phase 25 µm). The results of the luminance measurements indicate that the rates of luminance increase were: 68% (Example 5); 71% (Example 6); and 72% (Example 7), each of which provides significant luminance improvement.

Example 8
(Photosensitive Composition)

The following compounds were mixed to form a photosensitive composition:

| | |
|---|---|
| polyvinyl chloride | 150 parts by weight; |
| polymethyl methacrylate | 50 parts by weight; |
| p-diazo-N,N-dimethyl aniline salt | 10 parts by weight; |
| methyl alcohol | 100 parts by weight; and |
| methylethyl ketone | 550 parts by weight. |

The photosensitive composition was applied onto a polyethylene terephthalate sheet of 100 µm thickness to form a 100 µm thick photosensitive layer. The photosensitive layer was covered with a photo mask having a stripe pattern, and was exposed to ultraviolet light of 300 mJ/cm$^2$, and after the exposure, a heat processing was carried out at 120° C. Eventually, exposure of the entire surface was carried out with ultraviolet light of 300 mJ/cm$^2$ to obtain the desired optical functional sheet. Generation of air bubbles was confirmed in the exposed portions that were not shielded by the photo mask. The resultant sheet had a pattern having constant pitches along a direction crossing the stripes of 20 µm/40 µm for the light diffusing phase/the transparent phase.

The resultant sheet was mounted on a backlight with four straight lamps for personal computer monitors, and the luminance in the normal direction to the sheet surface was measured by using a luminance meter BM-7 commercially available from TOPCON Co. Ltd. Luminance increased by 21% compared with the condition without the sheet.

Example 9
(Photosensitive Composition)

The following compounds were mixed to form a photosensitive composition:

| | |
|---|---|
| polystyrene | 100 parts by weight; |
| neopentylglycol diacrylate | 25 parts by weight; |
| 2-benzyl-2-dimethylamino-1-(4-morpholinophenyl)butanone-1 | 0.5 part by weight; |
| cyclohexanone | 100 parts by weight; and |
| tetrahydrofuran | 50 parts by weight. |

The above-indicated photosensitive composition was applied onto a polyethylene terephthalate sheet of 100 µm thickness. The photosensitive layer was covered with a photo mask having a stripe pattern, and was exposed to ultraviolet light of 3000 mJ/cm$^2$, and was immersed in a methanol bath as it was for 10 minutes. After that, it was dried at room temperature for 30 minutes. It was confirmed that unexposed portions were porous phases. The resultant sheet had a pattern having constant pitches along a direction crossing the stripes of 20 µm/100 µm for the light diffusing phase/transparent phase. The film thickness was 200 µm.

The resultant sheet was mounted on a backlight with four straight lamps for personal computer monitors, and the luminance in the normal direction to the sheet surface was measured by using luminance meter BM-7 commercially available from TOPCON Co. Ltd. Luminance increased by 15% compared with the condition without the sheet.

Example 10

100 parts by weight of polyester resin ("ELITEL" UE3250, commercially available from UNITIKA), 50 parts by weight of acrylic monomer ("BLEMER" AP-150, commercially available from NOF Corporation) and 0.5 part by weight of light polymerization initiator ("IRGACURE" 651, commercially available from Ciba Specialty Chemicals) were dissolved into 100 parts by weight of a methylethyl ketone/cyclohexane mixture (1/1 by weight ratio). The resultant solution was applied onto a polyethylene terephthalate sheet ("LUMIRROR" 100 QT10, commercially available from TORAY) by using a blade coater, then was dried at 80° C. for 90 minutes, and after that, was cooled to obtain a resin sheet of 160 µm.

The sheet was a low temperature phase separation type (UCST) sheet, exhibiting white haze at lower temperature, and exhibiting phase solution to become transparent by heating at 90° C.

The sheet exhibiting white haze at room temperature was exposed at 100 mJ/cm$^2$ by using an ultra high voltage mercury lamp, and the exposed coating film was heated at 100° C., but the white haze remained and was not converted to a transparent phase, and thus the white haze phase was stabilized. The thickness of the coating film was 160 µm, transmittance to light was 76.52%, and haze was 93.54% and, thus, these conditions represent higher diffusive transmittance.

Further, the resin sheet was heated at 90° C. to a transparent state, and after that, the sheet was exposed at 100 mJ/cm$^2$ by using an ultra high voltage mercury lamp, while maintaining the transparent state. The resultant sheet was cooled to room temperature, and the transparency was not changed to a white haze and, thus, this indicates success in stabilizing the compatible phase. The thickness of the coating film was 160 µm, transmittance to light was 91.28%, and haze was 4.60% and, thus, these conditions represent higher direct transmittance.

Next, the resultant resin sheet was converted to a transparent state at 90° C., and thereafter a gap film of 100 μm was sandwiched on the resin sheet by disposing thereon a photo mask having a stripe pattern of stripes of 50 μm pitch and 30 μm width, and it was exposed at 35 mJ/cm$^2$ by using an ultra high voltage mercury lamp. After the exposure, the sheet was cooled to room temperature, and after leaving it for one hour, exposure of the entire sheet was carried out at 1000 mJ/cm$^2$ to obtain the stripe pattern.

The resultant coating film was sliced off to obtain thin slices, and the slices were observed by using an optical microscope, and it was found that an optical pattern was formed having a transparent phase of 30 μm corresponding to the pattern exposed portion and a white haze phase of 20 μm corresponding to the pattern unexposed portion, wherein these phases were alternately arranged and the aspect ratio of the transparent phase 2 was 5.3.

INDUSTRIAL APPLICABILITY

According to the present invention, an optical functional sheet which has a smooth surface that can be surface-treated or laminated with another functional sheet and which is provided with a light collecting effect due to the internal arrangements thereof, is obtainable. Further, the sheet can be an optical functional sheet involving an internally light collecting function that is capable of collecting both light diverging transversely and light diverging longitudinally by using a single sheet and, thus, can be used for applications such as a backlight for liquid crystal displays. Further, it is capable of being used to obtain a combined optical functional sheet which includes the light collecting function as well as other functions.

What it claimed is:

1. An optical functional sheet comprising, at least within the sheet, light diffusing phases and transparent phases each extending in a direction perpendicular to the surface of the sheet, wherein the light diffusing phases and the transparent phases are alternately arranged along the sheet surface direction and wherein L/p in any cross section of the sheet is 2–10, where L is the length of a transparent phase in a direction of the film thickness of the sheet and p is the length of a transparent phase in a direction along the sheet surface and, when the width of the transparent phase varies in the direction of the thickness of the sheet, p is the shorter of the length in the upper most portion and the length in the lower most portion of the sheet.

2. The optical functional sheet according to claim 1, wherein the shape of a projected image of a transparent phase onto the sheet surface is selected from the group consisting of a trigon, tetragon, hexagon, circle and ellipsoid.

3. The optical functional sheet according to claim 1, wherein a light diffusing phase is a transparent matrix component, in which fine particulate matter having a different refractive index from that of the matrix component is dispersed.

4. The optical functional sheet according to claim 1, wherein the light diffusing phases contain a number of bubbles, and the transparent phases do not contain bubbles.

5. The optical functional sheet according to claim 1, wherein the shapes of the cross sections of the light diffusing phases and the transparent phases in a direction normal to the sheet surface are selected from the group consisting of rectangle, square, parallelogram, trapezoid, trigon, campanulate or bell shape, horn shape, ellipsoid, and combinations thereof.

6. The optical functional sheet according to claim 1, wherein a ratio of the length L' of a light diffusing phase in a direction of the film thickness of the sheet to the length q of a light diffusing phase in a direction along the sheet surface (L'/q), in any cross section of the sheet, is not less than 1.

7. The optical functional sheet according to claim 1, wherein an area ratio of area of the light diffusing phases to area of the transparent phases within the surface of the sheet is 1/50–1/1.

8. The optical functional sheet according to claim 1, wherein the film thickness is 10–500 μpm.

9. A combined optical functional sheet comprising (1) an optical functional sheet according to claim 1 and (2) another optical functional sheet.

10. The combined optical functional sheet according to claim 9, wherein the another optical functional sheet (2) is a light diffusive sheet comprising a transparent matrix component in which fine particulate matter having a different refractive index from that of the matrix component is dispersed.

11. A backlight for a liquid crystal display comprising an optical functional sheet according to claim 1 and a light guiding plate.

12. A backlight for a liquid crystal display comprising an optical function sheet according to claim 1, a light diffusive sheet and a light guiding plate in this order, wherein the light diffusive sheet comprises a transparent matrix component in which fine particulate matter having a different refractive index from that of the matrix component is dispersed.

13. An optical functional sheet comprising, at least within the sheet, light diffusing phases and transparent phases each extending in a direction perpendicular to the surface of the sheet, wherein the light diffusing phases are arranged in a form of a continuous phase in which the light diffusing phases are mutually coupled in a direction along the sheet surface, and the transparent phases are arranged in a form of discontinuous phases in which the transparent phases are decoupled by the light diffusing phases, and wherein L/p in any cross section the sheet and is 2–10, where L is the length of a transparent phase in a direction of the film thickness of the sheet and p is the length of a transparent phase in a direction along the sheet surface and, when the width of the transparent phase varies in the direction of the thickness of the sheet, p is the shorter of the length in the upper most portion and the length in the lower most portion of the sheet.

14. The optical functional sheet according to claim 13, wherein the shape of a projected image of a transparent phase onto the sheet surface is selected from the group consisting of a trigon, tetragon, hexagon, circle and ellipsoid.

15. The optical functional sheet according to claim 13, wherein a light diffusing phase is a transparent matrix component, in which fine particulate matter having a different refractive index from that of the matrix component is dispersed.

16. The optical functional sheet according to claim 13, wherein the light diffusing phases contain a number of bubbles, and the transparent phases do not contain bubbles.

17. The optical functional sheet according to claim 13, wherein the shapes of the cross sections of the light diffusing phases and the transparent phases in a direction normal to the sheet surface are selected from the group consisting of rectangle, square, parallelogram, trapezoid, trigon, campanulate or bell shape, horn shape, ellipsoid, and combinations thereof.

18. The optical functional sheet according to claim 13, wherein a ratio of the length L' of a light diffusing phase in a direction of the film thickness of the sheet to the length q of a light diffusing phase in a direction along the sheet surface (L′/q), in any cross section of the sheet, is not less than 1.

19. The optical functional sheet according to claim 13, wherein an area ratio of area of the light diffusing phases to area of the transparent phases within the surface of the sheet is 1/50–1/1.

20. The optical functional sheet according to claim 13, wherein the film thickness is 10–500 μm.

21. A combined optical functional sheet comprising (1) an optical functional sheet according to claim 13 and (2) another optical functional sheet.

22. The combined optical functional sheet according to claim 21, wherein the another optical functional sheet (2) is a light diffusive sheet comprising a transparent matrix component in which fine particulate matter having a different refractive index from that of the matrix component is dispersed.

23. A backlight for a liquid crystal display comprising an optical functional sheet according to claim 13 and a light guiding plate.

24. A backlight for a liquid crystal display comprising an optical functional sheet according to claim 13, a light diffusive sheet and a light guiding plate in this order, wherein the light diffusive sheet comprises a transparent matrix component in which fine particulate matter having a different refractive index from that of the matrix component is dispersed.

* * * * *